United States Patent

Müntener

[11] Patent Number: 5,450,786
[45] Date of Patent: Sep. 19, 1995

[54] CONCHING DEVICE

[75] Inventor: Kurt Müntener, Bad Salzuflen, Germany

[73] Assignee: Richard Frisse GmbH Maschinenfabrik, Bad Salzuflen, Germany

[21] Appl. No.: 217,950

[22] Filed: Mar. 25, 1994

[30] Foreign Application Priority Data

Apr. 6, 1993 [DE] Germany ............ 43 10 805.9

[51] Int. Cl.⁶ .................. A23G 1/00; A23G 1/10; A23G 1/16; B01F 7/02
[52] U.S. Cl. .................. 99/485; 99/348; 99/472; 366/155; 366/196; 366/297; 366/301
[58] Field of Search ........ 99/348, 452, 472, 485, 99/486, 456–462; 366/83–86, 149, 290, 291, 297–301, 194–196, 154, 155; 426/519, 660

[56] References Cited

U.S. PATENT DOCUMENTS

| | | | |
|---|---|---|---|
| 3,216,706 | 11/1965 | Loomans | 366/85 |
| 3,570,569 | 3/1971 | Hartley et al. | 366/196 |
| 3,634,106 | 1/1972 | Organ et al. | 99/485 |
| 3,638,920 | 2/1972 | Davis | 366/298 |
| 3,663,231 | 5/1972 | Tourell | 99/485 |
| 3,682,086 | 8/1972 | Ocker | 99/485 |
| 4,630,930 | 12/1986 | Seiling | 366/194 |
| 4,679,498 | 7/1987 | Chaveron et al. | 366/85 |
| 4,733,607 | 3/1988 | Star et al. | 99/348 |
| 5,083,506 | 1/1992 | Horn et al. | 366/297 |
| 5,156,867 | 10/1992 | Leuthold et al. | 99/348 |

Primary Examiner—Timothy F. Simone
Attorney, Agent, or Firm—Martin A. Farber

[57] ABSTRACT

A conching device comprising at least one rotor shaft (4) having conching tools (5) is subdivided by partition walls (10, 11, 12) into compartments (13–16), so that in these compartments (13–16) different formulations can be conched simultaneously. The through holes for the rotor shaft (17) across the partition walls (10, 11, 12) between the compartments (13–16) are sealed by means of Belleville spring washers (18) such that no transport of chocolate paste can take place from one compartment (13–16) to another. Since the conching device comprises only one driving mechanism 8 and only two bearing units (6, 7) for each rotor shaft (4), there results a cost- and space-saving device, which can be employed in a manifold way. Thus, different formulations can be conched in the different compartments, which formulations can be processed parallely or at different times, by way of example.

12 Claims, 2 Drawing Sheets

CONCHING DEVICE

FIELD OF THE INVENTION

The invention refers to a conching device for kneading and mixing a chocolate paste, comprising a trough wherein at least one rotor shaft provided with tool arms is arranged rotatably about its axes, and a method for the batchwise conching of chocolate pastes by means of a conching device. The tool arms usually support wiper elements which virtually meet the inner wall of the trough.

BACKGROUND OF THE INVENTION

Conching devices are employed for refining chocolate pastes, e.g. after processing the chocolate paste on roller mills. When manufacturing large amounts of an equal formulation, there can be used continuous conching devices or batch conching devices having a large volume. In the production of small charges, there must be used small conching devices, since the conching trough has to be filled up to a minimum level.

Most chocolate manufacturers produce chocolate of different formulations. Some specialized factories employ up to 200 different formulations, most of which, however, are merely required in small amounts. Apart from the formulations that are manufactured in small amounts, there is mostly produced a milk chocolate, a black and a white chocolate in large amounts. To produce the different chocolates in different amounts with a minimum expenditure of labor, both small and large or continuous conching devices have to acquired. However, this calls for great capital investment and space requirement so that the advantages of the smaller expenditure of labor will again be compensated for.

It is an object of the present invention to describe a conching device which can be employed both for optimally producing relatively small and large amounts of chocolate pastes of different formulations requiring merely small capital investment and space requirement.

SUMMARY OF THE INVENTION

The invention attains the desired object by a conching device having a trough and at least one rotor shaft and only one driving mechanism and a partition wall extending crosswise to the rotor axis to divide the trough into at least two compartments. Each compartment has at least one inlet opening and at least one discharge opening. The compartments are so designed, or separated by partition walls, respectively, that no exchange of chocolate can take place between the compartments. In each compartment, conching tools, such as wipers, are fastened to the at least one common rotor shaft. With the rotor shaft rotating, the tools of each compartment knead and mix the chocolate paste contained therein. If in a compartment there should be no chocolate paste, the tools of this compartment will rotate without any resistance arising.

The advantage of a conching device as provided by the present invention consists in that either the same formulation or different ones can be conched in the case of two compartments, by way of example. With large amounts of a formulation, the conching device is employed like one having a large volume and with small formulations of a small amount, like two conching devices having half the volume. The expenses for equipment are much smaller with a conching device as provided by the invention than with a solution providing two individual conching devices. According to the invention, the conching device is provided with bearing units only at the end walls of the trough and it has only one driving mechanism. In the case of two conching devices, double the number of bearing units and driving mechanisms would be required.

With conching devices having four or six compartments, by way of example, their operating possibilities will substantially increase, without a greater number of bearing units and without more than one driving mechanism being required when using such an arrangement. Since the chocolate can be filled into the individual compartments and pumped off again at different times, the different formulations can always be introduced directly if they are ready. This ensures that the small amounts of different formulations supplied in succession by means of a single weighing station and a roller mill, can be introduced into the conching device for refining purposes substantially in a direct way. Charges of varying amounts are always subdivided into the particular number of compartments required for them.

The conching device as provided by the invention enables an optimum and manifold utilization of its total and partial capacities both with respect to the amounts processed and concerning the chronological order.

The whole course of manufacture is shortened, since different formulations can be simultaneously refined in different amounts. This advantage is achieved with minimum expenses for equipment.

A further advantage of the conching device designed according to the invention is preferably provided by the filling of the different compartments at different times. Owing to this, the chocolate pastes are present in differing viscosity conditions in the different compartments, which also corresponds to different amounts of energy introduced, or drive loads, respectively. The total amount of energy introduced into all the compartments is a medium value of the energy intake of the individual compartments. In the case of a single chocolate paste simultaneously filled in, this medium value clearly lies below the maximum amount of energy introduced during the whole conching time. This is caused by the fact that the amount of energy introduced in the conching process increases during the initial phase, remains on a maximum level during a short time and then slowly drops to a minimum value. Chronologically offset conching procedures taking place within the compartments of a conching device as provided by the invention successively reach the period of maximum energy intake, so that the total amount of energy introduced will be smaller than the sum of the individual maximum energy intakes. In other words, the energy intake will be equalized and the motor is utilized in a better way.

The rotary frequency of the rotor shafts can be substantially kept at a fixed value or else be controlled in dependence upon the condition of the chocolate paste of at least one compartment, or upon the total energy intake of all compartments or of the driving power. If necessary, the rotary frequency is increased or decreased with increasing or decreasing power in order to thus attain an averaging of the driving power.

Since the chocolate pastes of the different compartments will generally have differing residence times in these compartments, the load (and thus the drawing of current of the motor) will vary according to the number of the respective compartments just filled with chocolate paste. To avoid any faulty control thereby arising, it is preferred to transmit a signal corresponding to the number of the compartments filled to the motor control unit, which will generally contain a processor. This signal can be released by level sensors assigned to each compartment (e.g. an ultrasonic range finder arranged on the upper wall) but conveniently by a corresponding manual switch designed to input the number of the compartments being operated, or else by a switch connected to the shutter device for the respective discharge opening of each compartment. In the latter case a time function element is conveniently postponed to this switch, whose time constant corresponds to the time passing from the moment of opening the shutter device of the discharge up to the complete (or at least partial) emptying of the compartment thus being in a condition of emptying.

So that the compartments do not become very narrow, the conching device preferably has the total length of the conching trough, which is distinctly greater than the depth and width of the trough.

In the partition walls there are arranged through holes for the at least one rotor shaft. Since the rotor shaft can be bent under load crosswise to the rotational axis, the openings must be sufficiently large to avoid any wear caused by friction between the rotor shaft and the opening boundary. If the shaft were supported by the partition walls, this would lead to unnecessary technical problems due to the multiple bearing and the bearing sealing against the chocolate paste. For this reason, the conching device designed according to the invention provides no bearings but merely seals so that the chocolate is prevented from trespassing out of the openings in the partition walls from one compartment to the other.

There are preferably employed Belleville spring washers, which, on the one hand, are arranged on the partition wall and, on the other hand, on the pressure ring closely fitted to the rotary shaft in a sealing arrangement. To attain a sliding seal with the smallest possible sliding speed, the Belleville washer springs are preferably fastened to the partition wall, running with their connection area on a sliding area of the pressure ring, substantially arranged perpendicularly to the rotational axis. The sliding area is radially sized such that even in the case of a maximum motion of the shaft crosswise to its axis, the connection area lies in a sealing arrangement on the sliding area. Of course, there can also be provided any other seals. They must enable a sufficient sealing without too great wear arising and allow the rotor to swing crosswise to the axis. The seals can be arranged both on merely one or on both sides of each partition wall.

To enable the conching to take place in the different compartments at different temperatures, there are preferably provided separated cooling or heating circuits. At least in the trough wall area of each compartment, there is provided a cavity for a cooling or heating medium. But preferably, there is also provided a cavity in each partition wall on either side toward the respective adjacent compartments, which cavity is connected to the cooling or heating circuit of the compartment assigned thereto. Owing to this, the temperature of the whole chocolate paste of each compartment can be kept in a desired value range.

BRIEF DESCRIPTION OF THE DRAWINGS

In the following, the conching device as provided by the invention will be described in more detail by means of a drawing illustrating only one preferred embodiment.

DETAILED DESCRIPTION OF THE DRAWINGS

Figure 1:
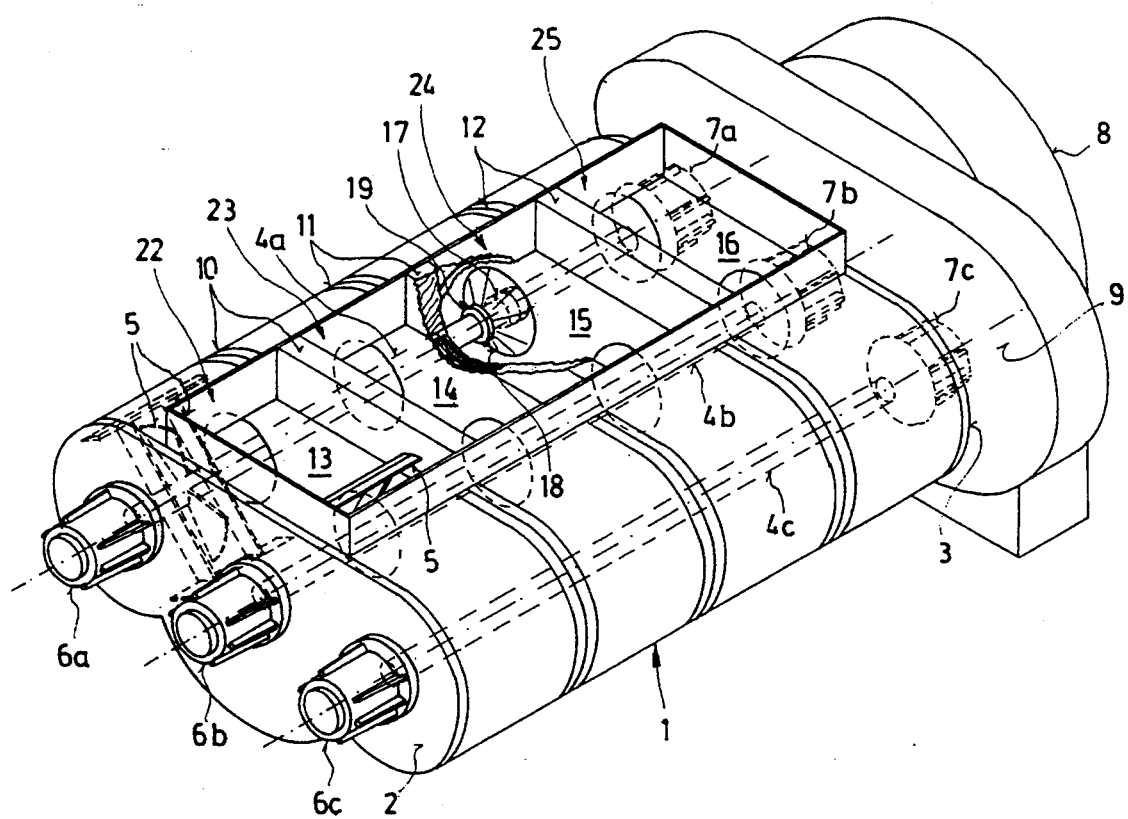
FIG. 1 Perspective view of a conching device having four compartments.

A conching device as provided by the invention according to FIG. 1 substantially comprises an oblong trough 1 having lateral end surfaces 2 and 3 and at least one rotor shaft 4 arranged along the trough length. There are preferably provided three parallel running rotor shafts 4a, 4b and 4c having conching tools 5. To support the rotor shafts 4a, 4b and 4c, there are provided bearing units 6a, 6b, 6c and 7a, 7b, 7c on the lateral trough end surfaces 2, 3. The rotor shafts are driven by a driving mechanism 8 via a transmission unit.

The trough 1 is subdivided by at least one, but preferably three partition walls 10, 11 and 12 arranged crosswise to the rotational axis of the rotor into a least two, but preferably four compartments 13, 14, 15 and 16. In each of the compartments 13–16, there are provided conching tools 5 fixed to the rotor shafts. Each partition wall comprises a through hole 17 for each rotor shaft, the size of which through hole 17 is selected such that there exists a free space for transverse movements of the rotor shaft 4. To avoid the overflowing of chocolate paste across this free space, there are provided seals 18, which are preferably designed as Belleville spring washers pressed against the respective partition wall 10, 11, 12 by a pressure ring 19.

Figure 2:
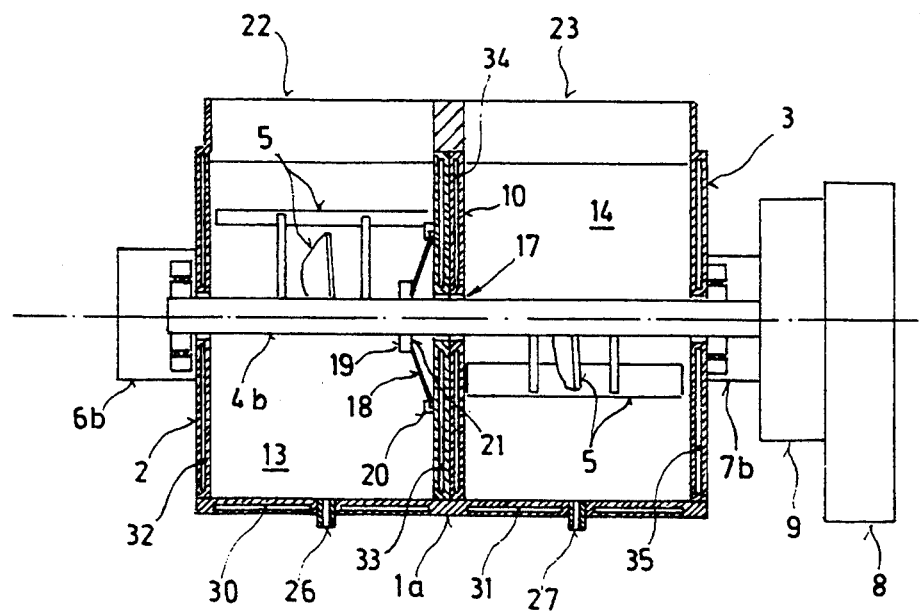
FIG. 2 Longitudinal section across a conching device having two compartments.

The embodiment of the conching device according to FIG. 2 provides a partition wall 10 and thereby two compartments 13, 14. The Belleville spring washer 18 designed for sealing the shaft 4b in the through hole 17 is rigidly connected to the partition wall 10 by a holder 20. The side 21 of the pressure ring 19 facing the partition wall 10 is designed as sliding area 21. This sliding area 21 is radially sized such that even in the case of a maximum motion of the shaft crosswise to the rotational axis the Belleville spring washer 18 still lies on the sliding area 21 in a sealing arrangement. Of course, there can also be provided any other seals enabling a sufficiently high sealing effect without a high wear arising and allowing for the lateral movement of the shaft. The seals can be arranged both on merely one or on both sides of the partition wall 10.

Each compartment comprises an inlet opening 22, 23 (according to FIG. 1: also 24, 25) preferably arranged on the upper side and a discharge opening 26, 27 arranged on the lowest position of each compartment. The chocolate paste can be introduced via the inlet openings 22, 23 even with the rotor shaft 4 being in rotation. As soon as the desired conching time or chocolate quality is achieved in a compartment 13, 14, the chocolate paste of this compartment can be discharged or pumped off, respectively, by the corresponding discharge opening 26, 27.

To temperate the chocolate paste of each compartment, there is provided a circuit for each one of a cooling or heating medium, if required. According to FIG. 2, there is provided a cavity 30, 31 in a wall 1a defining the trough 1 for each compartment 13, 14. Apart from the cavity 30 the cooling circuit of the compartment 13 also comprises a cavity 32 in the end wall 2 and a cavity 33 in the partition wall. Analogous to this, cavities 31, 34 in the partition wall 10 and 35 in the end wall 3 are part of the cooling circuit of the compartment 14. Between the cavities 33 and 34 of the partition wall 10 there is provided an insulating layer, if required, so that the circuits do not substantially influence each other.

Figure 3:
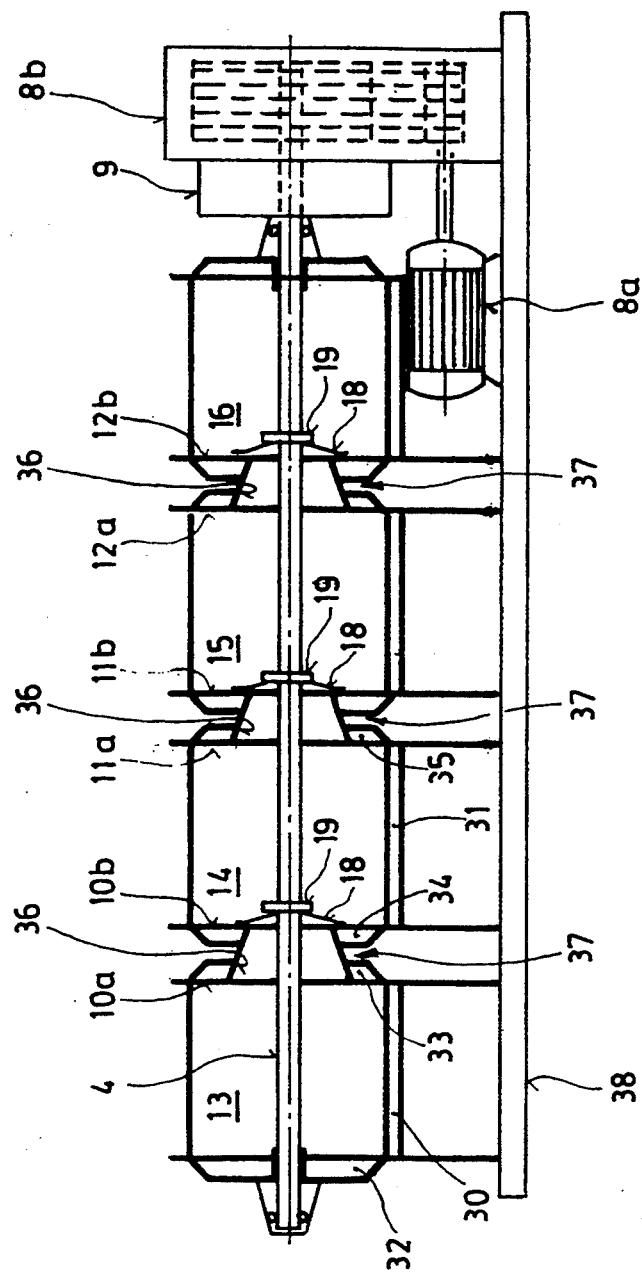
FIG. 3 Longitudinal section across a conching device having four individual troughs.

An embodiment according to FIG. 3 provides that the at least two, but preferably four compartments 13-16 are formed by fully developed troughs joined together. Owing to this, two respective partition walls 10a, 10b; 11a, 11b; 12a, 12b are preferably arranged spaced apart from one another at a distance forming an air gap 37. Preferably, each trough or each compartment 13-16 also comprises a cooling circuit. The cooling cavities are designated by the reference numerals 30-35 for the compartments 13 and 14. The air gap 37 between the compartments 13 and 14 acts as an insulating layer between the cavities 33 and 34. The troughs are preferably connected to each other by, particularly conical, tubing sleeves 36 (for the absorption of axial forces, e.g. by thermal expansion) accommodating the rotor shafts 4. Sealing is achieved between the rotor shafts 4 and the partition walls 10a-12b by Belleville spring washers 18 pressed against at least one partition wall 10-12b each by means of the pressure rings 19. If necessary, there is provided a frame 38 holding together the compartments 13-16 or the troughs, to which frame 38 there are fixed the trough walls. A driving motor 8a and a belt drive 8a is also fixed to the frame 38. Between the belt drive 8b and the at least one rotor shaft 4 there is arranged a transmission device 9, particularly a gear unit.

What is claimed is:

1. A conching machine for treating chocolate paste by kneading and mixing comprising wall means forming a trough for containing chocolate paste and comprising inner wall means as well as end wall means extending in substantially vertical plane, said trough extending along a longitudinal axis surrounded by said inner wall means;

partition means for diving said trough into at least two adjacent compartments in axial direction of said longitudinal axis, said compartments being separated from one another as to be able to treat chocolate pastes of different characteristics simultaneously within each of said compartments;

at least one rotor means extending along said longitudinal axis and including wiper elements extending in radial direction from said rotor means up about to said inner wall means said rotor means extending through said compartment and being common to them;

drive means for said rotor means so as to be common to said compartments;

sealing and bearing means including a seal between said partition means and said rotor means to prevent exchange of said chocolate pastes of different characteristics in said adjacent compartments;

at least two input opening means being assigned to one of said compartments for inputting one of said chocolate pastes into the respective compartment;

at least two discharge means each being assigned to one of said compartments for discharging one of said chocolate pastes out of the respective compartment.

2. Conching machine as claimed in claim 1, wherein said sealing and bearing means comprise only two bearings each being arranged at one of said end wall means, while said partition means comprise a through hole for each of said rotor means, said through hole having a diameter greater than that of the rotor means to allow some oscillatory movement of said rotor means in radial direction during its rotation, and said through hole being sealed by said sealing means which comprise a sealing device in sliding engagement with at least one of said rotor means and said partition means.

3. Conching machine as claimed in claim 2, wherein said sealing device comprises at least one Belleville spring washer arranged on each partition wall and surrounding said rotor means.

4. Conching machine as claimed in claim 3, wherein said Belleville spring washer is fixed to its partition wall.

5. Conching machine as claimed in claim 3, wherein said sealing device further comprises a pressure ring being axially fixed on said rotor means for pressing said Belleville spring washer against said partition wall.

6. Conching machine as claimed in claim 1, further comprising at least two tempering cicuits for circulating a tempering fluid, each tempering cicuit being assigned to one of said compartments to allow for separate temperation of it.

7. Conching machine as claimed in claim 6, wherein said tempering cicuits comprise at least one cavity within at least one partition means for allowing a flow of a tempering fluid.

8. Conching machine as claimed in claim 6, wherein at least one of said partition means arranged between two compartments having separate tempering cicuits comprise an isolating arrangement.

9. Conching machine as claimed in claim 8, wherein said isolating arrangement comprises two partition walls between two adjacent compartments, said partition walls having a predetermined distance from one another.

10. Conching machine as claimed in claim 9, wherein said distance forms an air gap.

11. Conching machine as claimed in claim 9, further comprising pipe socket means surrounding said rotor means between said partition walls.

12. Conching machine as claimed in claim 11, wherein said pipe socket means are conical, thus absorbing part of any thermal expansion.

* * * * *